(12) United States Patent
Dögel et al.

(10) Patent No.: US 8,939,860 B2
(45) Date of Patent: *Jan. 27, 2015

(54) HYDRODYNAMIC COUPLING DEVICE, IN PARTICULAR A TORQUE CONVERTER

(75) Inventors: Thomas Dögel, Bad Kissingen (DE); Ingrid Hoffelner, Knetzgau (DE); Michael Kühner, Heilbronn (DE); Mathias Kopp, Bamberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 131 days.

This patent is subject to a terminal disclaimer.

(21) Appl. No.: 13/699,812

(22) PCT Filed: Dec. 3, 2010

(86) PCT No.: PCT/EP2010/068822
§ 371 (c)(1),
(2), (4) Date: Nov. 26, 2012

(87) PCT Pub. No.: WO2011/147487
PCT Pub. Date: Dec. 1, 2011

(65) Prior Publication Data
US 2013/0085030 A1    Apr. 4, 2013

(30) Foreign Application Priority Data

May 25, 2010   (DE) .......................... 10 2010 029 255

(51) Int. Cl.
*F16H 45/02* (2006.01)
*F16H 47/08* (2006.01)
*F16H 35/00* (2006.01)
(Continued)

(52) U.S. Cl.
CPC ............ *F16H 35/00* (2013.01); *F16F 15/1478* (2013.01); *F16H 45/02* (2013.01); *F16D 47/06* (2013.01); *F16F 15/131* (2013.01); *F16F 15/14* (2013.01); *F16H 57/0006* (2013.01); *F16D 13/38* (2013.01); *F16D 33/18* (2013.01); *H02K 5/24* (2013.01); *H02K 7/006* (2013.01); *F16H 47/08* (2013.01); *F16F 15/13157* (2013.01);
(Continued)

(58) Field of Classification Search
CPC .......... F16H 41/00; F16H 45/02; F16H 47/08
USPC ................................................ 475/36, 47, 59
See application file for complete search history.

(56) References Cited

U.S. PATENT DOCUMENTS

| | | | | |
|---|---|---|---|---|
| 2002/0033310 | A1* | 3/2002 | Sasse et al. ................... | 192/3.29 |
| 2013/0068580 | A1* | 3/2013 | Doegel et al. ................. | 192/3.28 |

*Primary Examiner* — Edwin A Young
(74) *Attorney, Agent, or Firm* — Cozen O'Connor (57) ABSTRACT

A hydrodynamic coupling arrangement, particularly torque converter, comprises a housing arrangement (12) which is filled or fillable with fluid, an impeller (20), a turbine (28), a lockup clutch (54), a torsional vibration damping arrangement (42) with an input region (52) and an output region (82), wherein a first torque transmission path (46) and parallel thereto a second torque transmission path (48) and a coupling arrangement (50) for superposing the torques transmitted via the torque transmission paths (46,48) are provided between the input region (52) and the output region (82), wherein the torsional vibration damping arrangement (42) further includes at least in the first torque transmission path (46) a phase shifter arrangement (56) for generating a phase shift of rotational irregularities transmitted via the first torque transmission path (46) relative to rotational irregularities transmitted via the second torque transmission path.

23 Claims, 7 Drawing Sheets

(51) Int. Cl.
*F16F 15/14* (2006.01)
*F16D 47/06* (2006.01)
*F16F 15/131* (2006.01)
*F16H 57/00* (2012.01)
*F16D 13/38* (2006.01)
*F16D 33/18* (2006.01)
*H02K 5/24* (2006.01)
*H02K 7/00* (2006.01)

(52) U.S. Cl.
CPC ... *F16H 2045/0205* (2013.01); *F16H 2045/021* (2013.01); *F16H 2045/0268* (2013.01)
USPC .......................................................... 475/36

HYDRODYNAMIC COUPLING DEVICE, IN PARTICULAR A TORQUE CONVERTER

RELATED APPLICATIONS

This is a U.S. national stage of application No. PCT/EP2010/068822, filed on Dec. 3, 2010. Priority is claimed on the following application: German Application No. 10 2010 029 255.9 filed on May 25, 2010, the content of which is incorporated here by reference.

BACKGROUND OF THE INVENTION

1. Field of the Invention

The present invention is directed to a hydrodynamic coupling device, particularly a hydrodynamic torque converter, such as can be used, for example, in the drivetrain of a vehicle.

2. Description of the Related Art

Especially in drivetrains with internal combustion engines, a constant torque can generally not be introduced into a drivetrain because periodic ignitions occur in the internal combustion engines and the energy released as a result is converted into a rotational movement of the crankshaft. The torque delivered by the crankshaft and the rotational speed thereof are both subject to fluctuations and oscillations or, generally speaking, rotational irregularities. Because rotational irregularities of this type may be noticeable in driving mode, a general objective is to eliminate these rotational irregularities as far as possible.

For example, it is known in torque converters to use energy accumulators or energy storages, i.e., for example, springs or moving masses or combinations thereof, to temporarily store the energy occurring in rotational irregularities of the kind mentioned above and then to guide it into the drivetrain in such a way that a smoother speed characteristic or torque characteristic can be achieved. So-called turbine torsional vibration dampers and two-damper converters are examples of this. Mass pendulums known as speed-adaptive mass dampers convert the rotational irregularities occurring in driving condition into oscillating deflections of vibrating masses; the deflection is carried out in opposition to a centrifugal force and, by predefining the deflection path and the masses to be deflected, it is possible to tune to particular excitation speeds or excitation frequencies. Mass dampers of this type can, of course, be combined with systems of masses which execute oscillations through the use of springs or the like.

Because of the increasingly restricted space availability in modern vehicles, there is also less installation space available for the systems used for vibration damping with consequent loss of decoupling quality, i.e., in the reduction of occurring rotational irregularities.

SUMMARY OF THE INVENTION

It is an object of the present invention to provide a hydrodynamic coupling device which achieves an improved reduction of rotational irregularities introduced into the drivetrain.

According to the invention, this object is met through a hydrodynamic coupling device, particularly torque converter, comprising a housing arrangement which is filled or fillable with fluid, an impeller which is rotatable with the housing arrangement around an axis of rotation, a turbine which is arranged in the housing arrangement and which is rotatable with a driven member around the axis of rotation, a lockup clutch for producing a torque transmission connection between the housing arrangement and the driven member, a torsional vibration damping arrangement with an input region and an output region, wherein a first torque transmission path and parallel thereto a second torque transmission path and a coupling arrangement for superposing the torques transmitted via the torque transmission paths are provided between the input region and the output region, wherein the torsional vibration damping arrangement further includes at least in the first torque transmission path a phase shifter arrangement for generating a phase shift of rotational irregularities transmitted via the first torque transmission path relative to rotational irregularities transmitted via the second torque transmission path.

In the torsional vibration damping arrangement according to the invention, it is ensured through the use of the phase shifter arrangement that a destructive superposition of oscillation components occurs in the torque to be transmitted in that the transmitted torque is first divided and then recombined by the phase shift that is introduced. Ideally, the rotational irregularities are virtually completely eliminated at least in a particularly critical frequency range.

In order that this phase shift can be achieved efficiently in a structurally simple manner, it is suggested that the phase shifter arrangement includes an oscillation system having a primary side and a secondary side which is rotatable relative to the primary side around the axis of rotation against the force of a spring arrangement.

The phase shifter arrangement is accordingly constructed substantially on the basis of the operating principle of a dual-mass oscillator in which two masses, i.e., essentially the primary side and secondary side, oscillating relative to one another against the action of the spring arrangement are provided with a desired oscillation behavior through selection of spring stiffness on the one hand and of mass ratios and mass inertia at the primary side and secondary side on the other hand. An oscillation system of this kind characteristically has a resonant frequency. In the frequency range below the resonant frequency, an oscillation system of this kind exhibits subcritical oscillations, i.e., excitation and reaction of the system occur substantially simultaneously. When the resonant frequency is exceeded, a phase shift occurs so that excitation and reaction occur substantially out of phase with one another and the system accordingly operates supercritically. This phase shift which ideally has a maximum value of 180° is made use of by the present invention to achieve the desired reduction in rotational irregularities in that the torque oscillation component that is phase-shifted in this way is superposed with the non-phase-shifted torque oscillation component.

To achieve a further improvement in vibration damping behavior in the torque transmission path to the driven member, the output region includes a further oscillation system with a primary side and with a secondary side which is rotatable relative to the primary side against the action of a spring arrangement.

In a further particularly advantageous development of the present invention, the turbine is coupled to one of the torque transmission paths. This makes it possible to influence the superposition effect to be utilized according to the invention by making use of the mass of the turbine and, therefore, to achieve a further improved damping behavior.

In so doing, it is particularly advantageous when the turbine is coupled to the first torque transmission path, preferably coupled to the secondary side of the oscillation system in the first torque transmission path.

In order to produce and cancel, respectively, the direct torque transmission connection between the housing arrangement and the driven member by means of the lockup clutch, it can be provided, for example, that the lockup clutch is operatively arranged in one of the torque transmission paths, preferably in the first torque transmission path. By interrupting one of the torque transmission paths, the superposition of torque and therefore the entire torque flow through the torsional vibration damping arrangement is interrupted.

In an alternative variant it can be provided that the lockup clutch is operatively arranged in the output region. Accordingly, in this case the torque flow can be interrupted in a region located between the coupling arrangement and the driven member by disengaging the lockup clutch.

In another alternative embodiment, the lockup clutch can be operatively arranged in the input region. This means that the lockup clutch is located and is operative in the torque flow in a region between the housing arrangement and that region in which the torque to be transmitted is divided between the two torque transmission paths.

In an embodiment which is very simple in terms of construction and can be realized in a compact manner, that the coupling arrangement comprises a planetary transmission arrangement. To this end, it can be provided, for example, that the planetary transmission arrangement includes a planet gear carrier which is connected to the second torque transmission path and which has a plurality of planet gears rotatably supported on it. It is to be noted that the planet gears can be formed as essentially circular gears, i.e., gears which are toothed around the entire circumference, or alternatively can also be formed as segmented gears.

In order that the planetary transmission arrangement and planet gears thereof can be used in a simple manner for combining the torques or torque components transmitted via the two torque transmission paths, the planetary transmission arrangement includes a first coupling gear arrangement in meshing engagement with the planet gears which is connected to the first torque transmission path and a second coupling gear arrangement in meshing engagement with the planet gears which is connected to the output region.

In this way it can be provided, for example, that the first coupling gear arrangement in connection with the planet gears and the second coupling gear arrangement in connection with the planet gears provide transmission ratios that are identical to one another. By providing substantially identical transmission ratios, the torque components of the total torque to be transmitted which are directed via the two torque transmission paths can be made substantially equal.

The torques or torque components to be transmitted via the two torque transmission paths can be influenced in such a way that they are not equal to one another in that the first coupling gear arrangement in connection with the planet gears and the second coupling gear arrangement in connection with the planet gears provide transmission ratios that differ from one another.

The first coupling gear arrangement and the second coupling gear arrangement can be constructed in each instance as a ring gear arrangement, i.e., can cooperate with the planet gears in the radially outer region thereof. Alternatively, it can be provided that the first coupling gear arrangement and the second coupling gear arrangement each comprise a sun gear arrangement.

To further influence the vibration damping behavior, it can be provided that the oscillation system and/or the further oscillation system include(s) at least two vibration dampers arranged in series with one another and respectively comprising a primary side and a secondary side which is rotatable relative to the primary side. Alternatively or in addition, it can be provided that the oscillation system and/or the further oscillation system include(s) at least two vibration dampers acting in parallel with one another and respectively comprising a primary side and a secondary side which is rotatable relative to the primary side.

When the oscillation system and/or the further oscillation system comprise(s) a speed-adaptive vibration damping arrangement having at least one deflection mass which can be deflected in circumferential direction from a basic position and which in so doing changes its distance from the axis of rotation, it is further possible to adapt the vibration damping behavior in the hydrodynamic coupling device constructed according to the invention to specific excitation frequencies and orders thereof.

In an alternative embodiment, this can be achieved in that the oscillation system and/or the further oscillation system include(s) a fixed-frequency vibration damping arrangement having at least one oscillation mass which can be deflected against the action of a return spring arrangement.

Further, the vibration damping behavior can be influenced in an advantageous manner in that a friction damping arrangement is associated with the oscillation system and/or with the further oscillation system, which friction damping arrangement opposes a relative rotation between primary side and secondary side thereof.

DESCRIPTION OF THE DRAWINGS

The present invention will be described in detail in the following with reference to the accompanying drawings, in which.

DETAILED DESCRIPTION OF THE PREFERRED EMBODIMENTS

Figure 1:
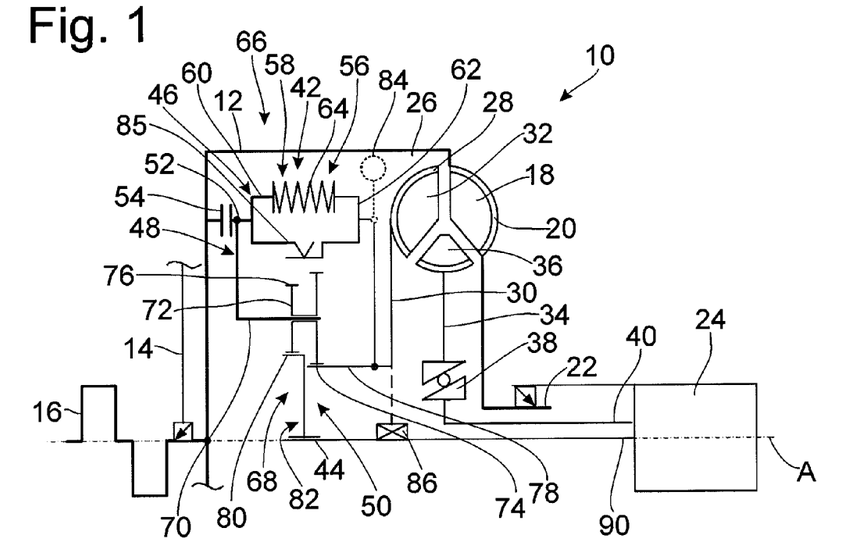
FIG. 1 shows a schematic longitudinal sectional view through a hydrodynamic coupling device.

A hydrodynamic coupling device 10 in the form of a hydrodynamic torque converter is realized in FIG. 1. The coupling device 10 comprises a housing 12 which is coupled to a drive unit, for example, an internal combustion engine 14, indicated schematically, and the crankshaft 16 thereof, and is accordingly rotatable around an axis of rotation A. Impeller blades 18 are provided successively in circumferential direction at an inner side of the housing 12 so as to provide an impeller 20 which is rotatable with the housing 12 around the axis of rotation A. An impeller hub 22 provided by the housing 12 is positioned so as to engage in a transmission 24 and in rotational operation of the housing 12 can drive a fluid pump or oil pump provided in the transmission 24.

A turbine, designated generally by 28, is arranged in the interior 26 of the housing 12. This turbine 29 includes a turbine shell 30 and a plurality of turbine blades 32 which are supported thereon axially opposed to the impeller blades 18. A stator 34 including the stator blades 36 thereof is arranged axially between the impeller 20 and the turbine 28. The stator 34 is carried on a hollow supporting shaft 40 via a freewheel arrangement 38 so as to be rotatable in a direction around the axis of rotation A.

A torsional vibration damping arrangement, designated generally by 42, is provided in the interior 26. This torsional vibration damping arrangement 42 lies in the torque transmission path between the housing 12 and a driven member 44, for example, a turbine hub. The torsional vibration damping arrangement serves to divide the torque that is received by the housing 12 and transmitted to the driven member 44 into two torque transmission paths 46, 48 and, through combination of the torque components transmitted via the two torque transmission paths 46, 48 at a coupling arrangement 50, to reduce or ideally completely eliminate rotational irregularities, i.e., for example, torque oscillations or fluctuations.

The torsional vibration damping arrangement 42 includes an input region 52 which receives via a lockup clutch 54 the torque introduced into the housing 12. This lockup clutch 54 is accordingly associated with the input region 52 of the torsional vibration damping arrangement 42 and acts between the latter and the housing arrangement 12. It is to be noted that the lockup clutch 54 can be constructed, in a manner known per se, with a clutch piston which can be pressed either directly against the housing 12 or against annular disk-shaped friction elements which can be brought into frictional interaction with one another.

The two torque transmission paths 46, 48 branch out in the input region 52. The first torque transmission path 46 thereof comprises a phase shifter arrangement 56 which causes the torque transmitted via this first torque transmission path 46 to undergo a phase shift relative to the torque transmitted via the second torque transmission path 48.

The phase shifter arrangement 56 includes a torsional vibration damper 58 having a primary side 60, a secondary side 62 and a spring unit 64 which opposes a relative rotation between the primary side 60 and the secondary side 62. It is to be noted that the torsional vibration damper can be constructed in a conventional manner and, for example, can comprise as primary side a hub disk and as secondary side two cover disk elements which are disposed on either side thereof and which are fixedly connected to one another. The spring unit 64 can have a plurality of springs, preferably helical compression springs, which are disposed successively in circumferential direction and which, being supported at the primary side 60 and secondary side 62, cause a restoring force thereof with respect to one another in direction of a neutral relative rotational position. Accordingly, in the embodiment example shown in FIG. 1, the torsional vibration damper 58 substantially provides an oscillation system 66 which leads in the first torque transmission path 46 to a phase shift of rotational irregularities or torque oscillations transmitted via this first torque transmission path 46. This oscillation system 66 has a natural frequency or resonant frequency as a result of the masses present at the primary side and secondary side 62 and the spring unit 64 of the torsional vibration damper 58 which provides the spring arrangement of the oscillation system 66 in this case. When vibrations are excited below this natural frequency, vibrations which are to be transmitted are transmitted substantially without a phase shift. When the resonant frequency is exceeded, a phase shift occurs which can ideally amount to at most 180° so that exciting vibrations and transmitted vibrations are out of phase with one another.

The torques or torque components transmitted via the two torque transmission paths 46, 48 are combined again in the coupling arrangement 50. To this end, the coupling arrangement 50 is constructed as a planetary transmission arrangement 68 and comprises a planet gear carrier 70 coupled to the first torque transmission path 48. This planet gear carrier 70 carries a plurality of planet gears 72 distributed in circumferential direction. These planet gears 72 have two sets of teeth 74, 76 which are axially offset with respect to one another and which in the embodiment example shown in FIG. 1 have diameters which differ from one another with respect to the rotational axes of the planet gears 72 at the planet gear carrier 70.

A first sun gear 78 is connected to the secondary side 62 of the torsional vibration damper 58 and oscillation system 66, respectively, and is in meshing engagement with the teeth 74 of the planet gears 72. A second sun gear 80 which substantially also provides an output region 82 of the torsional vibration damping arrangement 46 is in a toothed engagement with the teeth 76 of the planet gears 72.

Through cooperation of the planet gears 72 with the two sun gears 78, 80, these planet gears 72 being carried on the planet gear carrier 70 so as to be freely rotatable in principle, the planetary transmission arrangement 68 causes the torques transmitted via the two torque transmission paths 46, 48 to be combined. If these torques contain oscillation components and if the frequency of these oscillation components or fluctuation components is below the resonant frequency of the oscillation system 66, the two torques or torque components are combined and superposed in phase in the coupling arrangement 50. The torque transmitted into the output region 82 accordingly also approximately corresponds with respect to its fluctuation characteristic to the torque received in the input region 52 of the lockup clutch 54.

However, if the frequency of the oscillation component lies above the resonant frequency of the oscillation system 66, i.e., of the torsional vibration damper 58 in this instance, the two torques transmitted with their oscillation components via the torque transmission paths 46, 48 are destructively superposed in the coupling arrangement 50. Ideally, i.e., with a phase shift of 180°, the oscillation components can be completely eliminated so that the torque received at the output region 82 has a substantially smooth characteristic or at least a characteristic with appreciably reduced oscillation.

To further influence the damping behavior of the torsional vibration damping arrangement 42, a supplementary mass 84 can be associated, for example, with the secondary side 62 so as to increase the mass on the secondary side and therefore exert an influence on the resonant frequency. Further, a friction damping arrangement, designated generally by 85, can be associated with the oscillation system 66, which friction damping arrangement 85, for example, can act parallel to the spring unit 64 between the primary side 60 and the secondary side 62 and can be configured as a Coulomb friction device or as a fluid friction device. Providing a friction damping arrangement 85 of this type acting in parallel with the spring unit 64 also substantially influences the magnitude of the phase shift introduced by the oscillation system 66.

The turbine 28, together with the secondary side 62 of the torsional vibration damper 58, is coupled to the sun gear 78. In so doing, it contributes to the increase in the secondary-side mass of the torsional vibration damper 58, which results in a very good vibration damping behavior.

Since the turbine 28 contributes to the increase in the secondary-side mass of the torsional vibration damper 58, this supplementary mass 84 can also be omitted if required.

The sun gear 78 is supported together with the turbine 28 on a transmission input shaft 90 by a bearing 86. Alternatively, this bearing support could also be provided with respect to the output region 82, i.e., for example, at the sun gear 80 or at the driven member 44.

The configuration of the torsional vibration damper 58, i.e., the mass at the primary side 60, the mass at the secondary side 62, the stiffness of the spring unit 64, and the supplementary mass 84 possibly reinforcing the secondary-side mass generally aims for the lowest possible natural frequency of the oscillation system 66 in order to achieve the transition to the supercritical operating condition, i.e., the operating condition working with phase shift, already at comparatively low excitations of oscillation, i.e., already at a comparatively low rotational speed.

Due to the fact that the two sets of teeth 74, 76 have different diameters with respect to one another and, therefore, the two sun gears 78, 80 accordingly also have different ring gears with respect to one another, it is possible to exert an influence on the distribution of torques to the two torque transmission paths 48, 48. The closer the diameters of the sun gears 78, 80 to one another, and therefore the closer the diameters of the sets of teeth 74, 76 to one another, the more uniform the components of the torques transmitted via the two torque transmission paths 46, 48. In the embodiment example shown in FIG. 1 in which the teeth 74 cooperating with the sun gear 78 have a greater diameter, a transmission ratio below 1 is achieved; with the reverse size ratio, a transmission ratio above 1 is achieved. In the former case, the torque transmitted via the first torque transmission path 46 is increased by making use of a torque flow reversal in the second torque transmission path 48, namely, while supported at the coupling arrangement 50. In this case also, a destructive superposition of the two torque flows in the torque transmission paths is used to obtain a substantially smoother total torque at the output region 82. In the latter case, i.e., when teeth 76 are larger and teeth 74 are smaller, the torque introduced at the input region 52 is divided corresponding to the size ratios in such a way that a torque flow is carried out in the same direction in both torque transmission paths 46, 48 and the two torque components guided in the same direction are superposed on one another in the coupling device 50.

Figure 2:
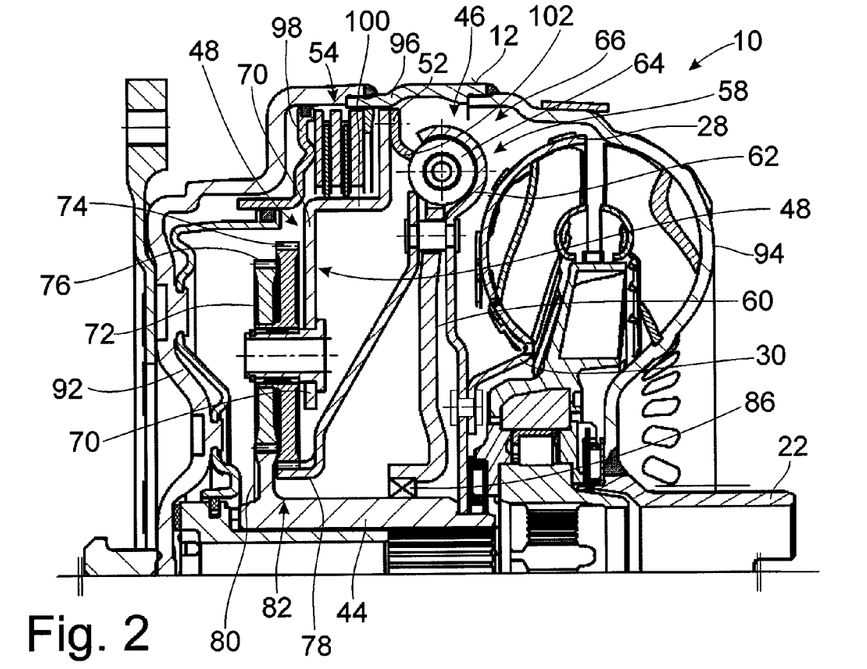
FIG. 2 shows a fragmentary longitudinal sectional view through a construction of the coupling device shown in FIG. 1.

FIG. 2 shows an embodiment of the construction of a coupling device 10 shown schematically in FIG. 1. The housing 12 is shown with a housing shell 92 to be positioned facing the drive unit and a housing shell 94 which is to be positioned facing the transmission and at which the impeller hub 22 is also provided. An annular connecting housing element 96 is provided between the two housing shells 92, 94.

The lockup clutch 54 includes a clutch piston 98 which is movable by fluid pressure and by which a plurality of annular disk-shaped friction elements which are rotatable with the housing 12 and a plurality of annular disk-shaped friction elements which are rotatable with a friction element carrier 100 can be pressed against one another to produce the engaged condition. The friction element carrier 100 at the same time also forms the planet gear carrier 70 of the second torque transmission path 48.

A connection element 102 leading to the primary side 60 of the torsional vibration damper 58 and oscillation system 66 is fixedly connected to the radially outer region of the friction element carrier 100. This primary side comprises a central disk element. The secondary side 62 comprises two cover disk elements, one of which, the right-hand cover disk element, i.e., that facing housing shell 94, can surround the springs of the spring unit 64 in the circumferential region thereof and, in the radially inner region, is fixedly connected, e.g., riveted, to the turbine shell 30. The cover disk element of the secondary side 62, which cover disk element faces the housing shell 92, projects radially inward, where it forms the sun gear 78 cooperating with the larger-diameter teeth 74 of the planet gears 72. The teeth 76 of the planet gears 72 having the smaller diameter in this instance cooperate with the driven-side sun gear 80 which is here formed integral with the driven member 44, i.e., the turbine hub.

It is to be noted that the planet gear 72 shown in FIG. 2 is formed of two parts; a first gear part having a larger diameter provides teeth 74 and a second gear part which is fixedly rotatably connected to the first gear part provides teeth 76. On the other hand, of course, these two gear parts can also be constructed integral with one another. Further, the planet gears 72 are axially and radially supported at the planet gear carrier 70 by carrier bolts and bearings provided at the latter and are rotatable around their central axis.

The primary side 60 of the torsional vibration damper 58 is rotatably supported on the driven member 44 radially inwardly by the bearing 86.

Figure 3:
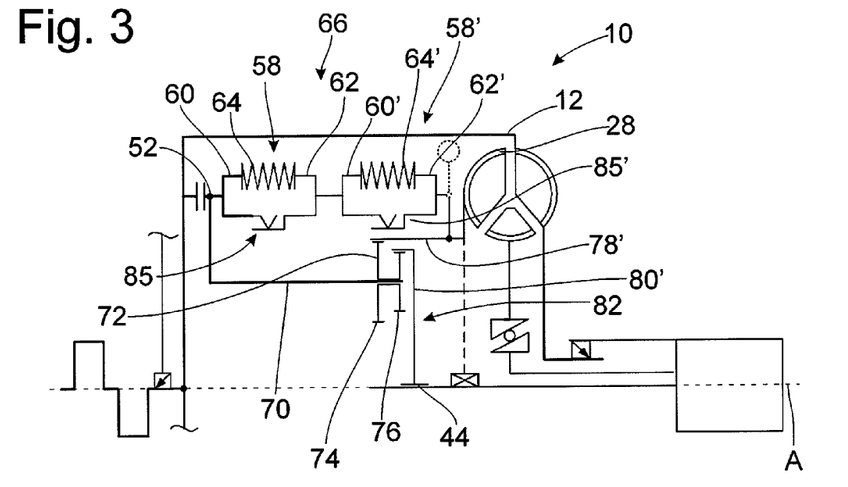
FIG. 3 shows a view corresponding to FIG. 1 of an alternative embodiment.

An alternative construction is shown in FIG. 3. It will be seen in this case that the oscillation system 66 is formed with two torsional vibration dampers 58, 58' working in series. The secondary side 62 of torsional vibration damper 58 is connected to the primary side 60' of torsional vibration damper 58', whose secondary side 62' is rotatable relative to the primary side 60' in a limited rotational angle range around the axis of rotation A against the action of springs of a spring unit 64'. This secondary side 62', together with turbine 28, is connected to a coupling gear, now formed as ring gear 78', for cooperating with the planet gears 72. The driven-side coupling gear, here likewise formed as ring gear 80', is connected to the driven member 44.

A friction damping arrangement 85, 85' can be associated with each of the two torsional vibration dampers 58, 58' so that influence can be exerted on the damping behavior and, in particular, the type of phase shift from the subcritical state to the supercritical state.

In order to achieve a parallel connection of the two torsional vibration dampers 58, 58', the primary sides 60, 60' thereof on the one hand and the secondary sides 62, 62' on the other hand can be coupled with one another so that the spring units 64, 64' act in parallel.

Figure 4:
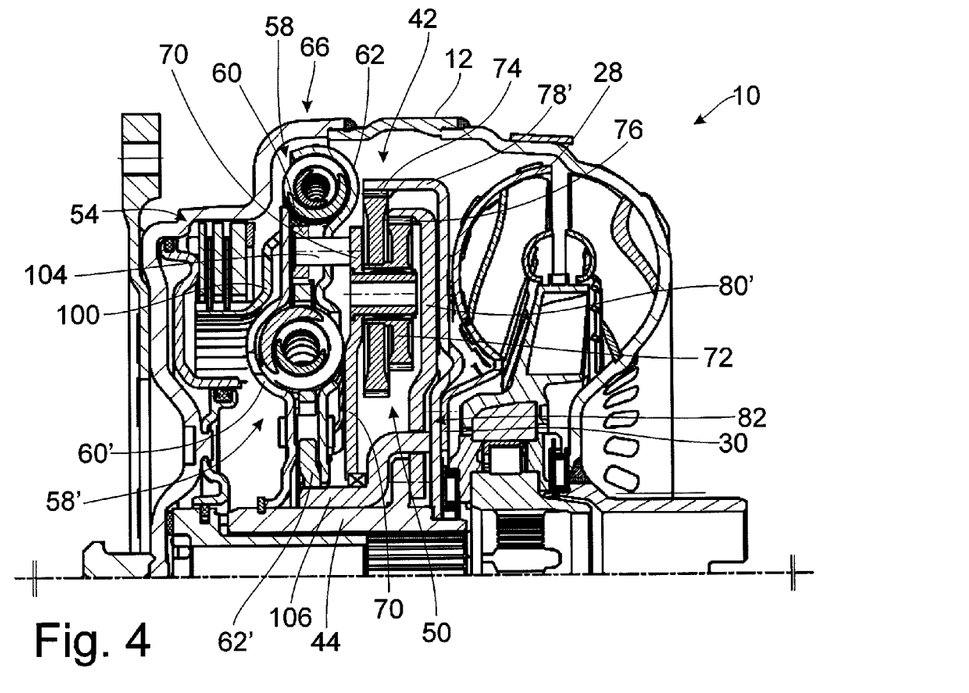
FIG. 4 shows a fragmentary longitudinal sectional view through a construction of the coupling device shown in FIG. 3.
Figure 5:
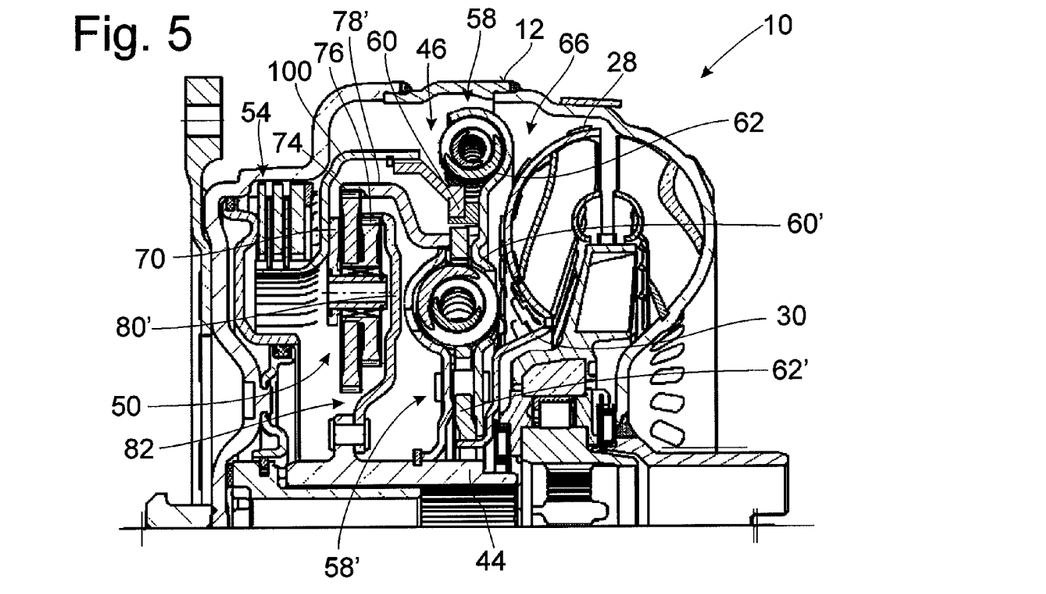
FIG. 5 shows a fragmentary longitudinal sectional view through a construction of the coupling device shown in FIG. 3.
Figure 6:
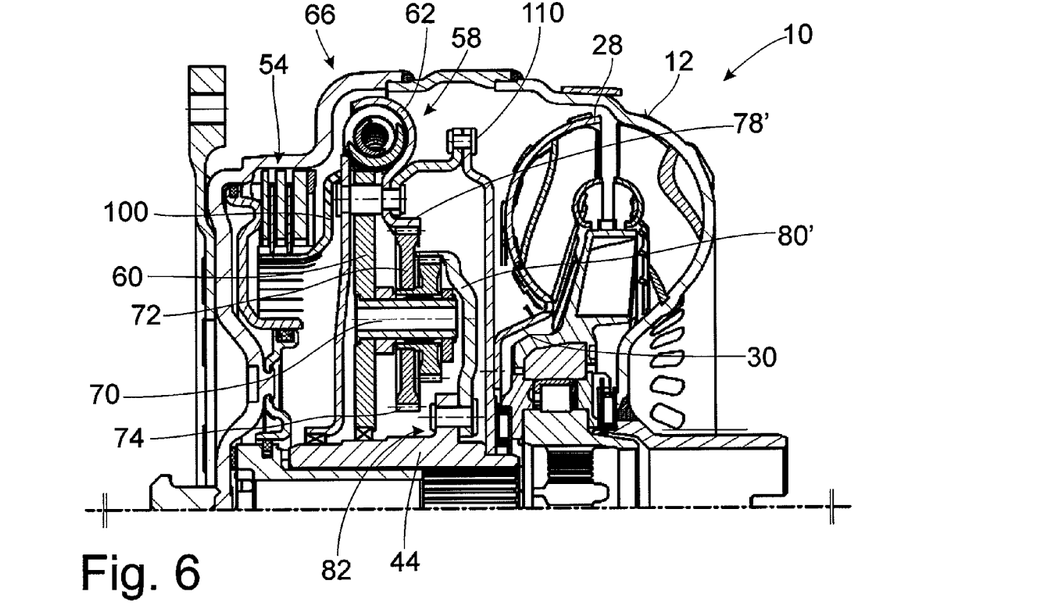
FIG. 6 shows a fragmentary longitudinal sectional view through a construction of the coupling device shown in FIG. 3.

Embodiments related to such an arrangement are shown in FIGS. 4 to 6. FIG. 4 again shows the friction element carrier 100 which is connected to the primary side 60 of the torsional vibration damper 58, this primary side 60 being formed as a central disk element in this instance. The planet gear carrier 70 is fixedly connected to this central disk element by one or more connection pins 104. Thus, together with the central disk element of the primary side 60, the friction element carrier 100 substantially also forms that region in which a branching into the two torque transmission paths takes place, i.e., into the input region of the torsional vibration damping arrangement 42.

The secondary side 62 of torsional vibration damper 58 comprises the radially outer region of two cover disk elements which are arranged at a distance from one another and fixedly connected to one another. The radially inner region thereof forms the primary side 60' of the second torsional vibration damper 58' of the oscillation system 66. Another central disk element located inside the central disk element of the primary side 60 of torsional vibration damper 58 essentially forms the secondary side 62' of torsional vibration damper 58' and is fastened, for example, welded, in its radially inner region to a connection element 106. Accordingly, it will be see that the two torsional vibration dampers 58, 58' of the oscillation system 66 are arranged so as to be radially nested one inside the other in this case and lie approximately on the same axial level. The nesting of the ring gears 78' 80' makes it possible to present them from one side and to attach them to the planet gears 72, which facilitates assembly. The connection of ring gear 78' to connection element 106, for example, by a spline, can also be conducive for this purpose. The coupling device 50 with the planet gears 72 carried at the planet gear carrier 70 is located directly adjacent to these two torsional vibration dampers 58, 58' resulting in a very axially compact construction. The lockup clutch 54 is located at the other side of the two radially staggered torsional vibration dampers 58, 58' resulting in an axial sequence comprising lockup clutch, two radially staggered torsional vibration dampers and coupling device.

The connection element 106 extends through elongated apertures in the ring gear 80' enabling a relative rotation between this ring gear 80' which is to be associated with the output region 82 and that of the secondary side 62' of the oscillation system 66 which is provided in this case by the secondary side 62' of the torsional vibration damper 58. The connection element 106 is further connected to the ring gear 78 which is in meshing engagement with the planet gears 72, in this case with the teeth 74 having the larger diameter, so that a nested positioning of the two ring gears 78', 80' acting as coupling gears is also achieved in this case.

The turbine 28 is connected, e.g., welded, by its turbine shell 30 to the ring gear 78 and, therefore, also to the secondary side 62' of the torsional vibration damper 58, i.e., of the oscillation system 66. In order to make it easier for the connection element 106 to extend through the ring gear 80', this ring gear 80' could also be constructed in a segmented manner, with one segment in that location where a planet gear 72 is also positioned in a circumferential region, so that corresponding portions of the connection element 106 can extend through axially between segments of this kind. This is possible because only a limited circumferential rotation occurs in an oscillating manner between ring gear 80', i.e., the output region 82, and planet gear carrier 70, i.e., also planet gears 72, which limited circumferential rotation substantially also corresponds to the circumferential relative movement between the primary side 60 of torsional vibration damper 58 and the secondary side 62' of torsional vibration damper 58' which correspond to and provide the primary side and the secondary side of the oscillation system 66.

A limiting of the rotational angle for the two torsional vibration dampers 58, 58' can be provided by the rivet elements connecting the two cover disk elements or also by the pins 104 which connect the planet gear carrier 70 to the central disk element, i.e., the primary side 60 of the torsional vibration damper 58, and which extend through at least one of the cover disk elements. In this way, the springs of the spring units of the two torsional vibration dampers 58, 58' can be prevented from fully compressing under excessive load.

A radial centering of the two torsional vibration dampers 58, 58' can be achieved in that one of the cover disk elements, in this case the cover disk element on the left-hand side, is rotatably supported and, for example, also axially supported in its radially inner region on the driven member 44. Further, the ring gear 78 can also be axially and/or radially supported in its radially inner region at the driven member 44. A plain bearing can be used for this purpose, for example.

In the construction shown in FIG. 5, the axial relative position of the two torsional vibration dampers 58, 58', which are again radially staggered with respect to one another, and the coupling device 50, i.e., the planetary transmission arrangement, is exchanged so that this coupling device 50 is now positioned axially between the lockup clutch 54 and the oscillation system 66. The friction element carrier 100 which is connected to the central disk element of the primary side 60 of torsional vibration damper 58 to provide the first torque transmission path 46 is at the same time also connected to the planet gear carrier 70 of the second torque transmission path 46 or can be formed integral with it. The ring gear 78' is connected to the central disk element of the secondary side 62' of the radially inner torsional vibration damper and for this purpose, in the region located radially between the two spring units of the torsional vibration dampers 58, 58', projects through that cover disk element of the two cover disk elements that is positioned facing the lockup clutch 24.

A plug-in connection is produced between the friction element carrier 100 and the central disk element or primary side 60 of the torsional vibration damper 58 by sets of teeth axially inserted in each other. For this purpose, a plug-in connection extension which projects axially in a corresponding manner is provided at the central disk element or primary side 60, and the friction element carrier can be brought axially into a plug-in connection with this axially projecting plug-in connection extension. Alternatively, the friction element carrier could also be connected directly to the central disk element, e.g., by plug-in connection, riveting or extrinsic bonding.

The turbine 28 is coupled, e.g., splined, by its turbine shell 30 in the radially inner region to the central disk element of the secondary side 62' of the radially inner torsional vibration damper 58' so as to be fixed with respect to relative rotation.

In the embodiment shown in FIG. 6, the oscillation system 66 has only one torsional vibration damper 58 whose primary side 60, formed in this case as central disk element and supported on the driven member 44, is coupled with the friction element carrier 100 for common rotation. With one of the two cover disk elements forming the secondary side 62 of the torsional vibration damper 58, this secondary side 62 forms the ring gear 78' which is in meshing engagement with the teeth 74 of the planet gears 72. A connection assembly 110 supporting the turbine 28 is coupled to the secondary side of torsional vibration damper 58 by the rivet bolts which connect the two cover disk elements to one another.

The ring gear 80' on the driven side or output side is fixedly connected, e.g., riveted, in its radially inner region to the driven member 44, but could also be formed integral with it.

Figure 7:
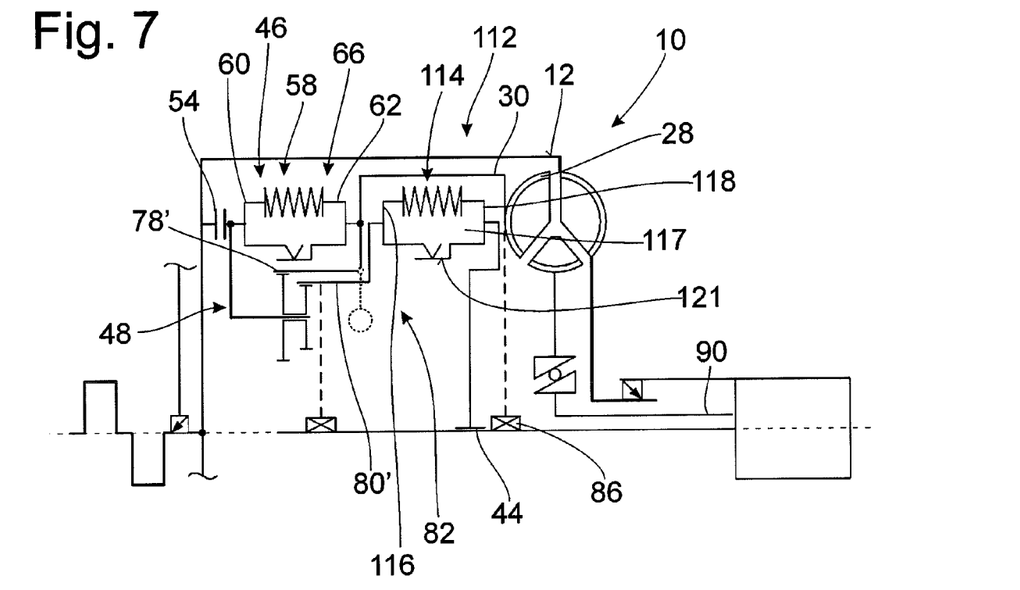
FIG. 7 shows another view corresponding to FIG. 1 of an alternative embodiment.

FIG. 7 shows a coupling device 50 in which a further oscillation system 112 with a torsional vibration damper 114 is associated with the output region 82. This further oscillation system 112 comprises a primary side 116 coupled to the ring gear 80' and a secondary side 118 coupled to the driven member 44. A spring unit 117 formed by a plurality of springs or groups of springs acts between the latter. Further, a friction damping arrangement 121 can act between the primary side and the secondary side.

The further oscillation system 112 also acts between the turbine 28 and the driven member 44 when the lockup clutch 54 is disengaged. In this condition, the oscillation system 66 or torsional vibration damper 58 thereof can oscillate freely in the manner of a fixed-frequency mass damper and, accordingly, cannot transmit torque in this condition.

Together with the secondary side 62 of the torsional vibration damper 58, the turbine can be supported on the transmission input shaft 90 or driven member 44 by the bearing 86.

Figure 8:
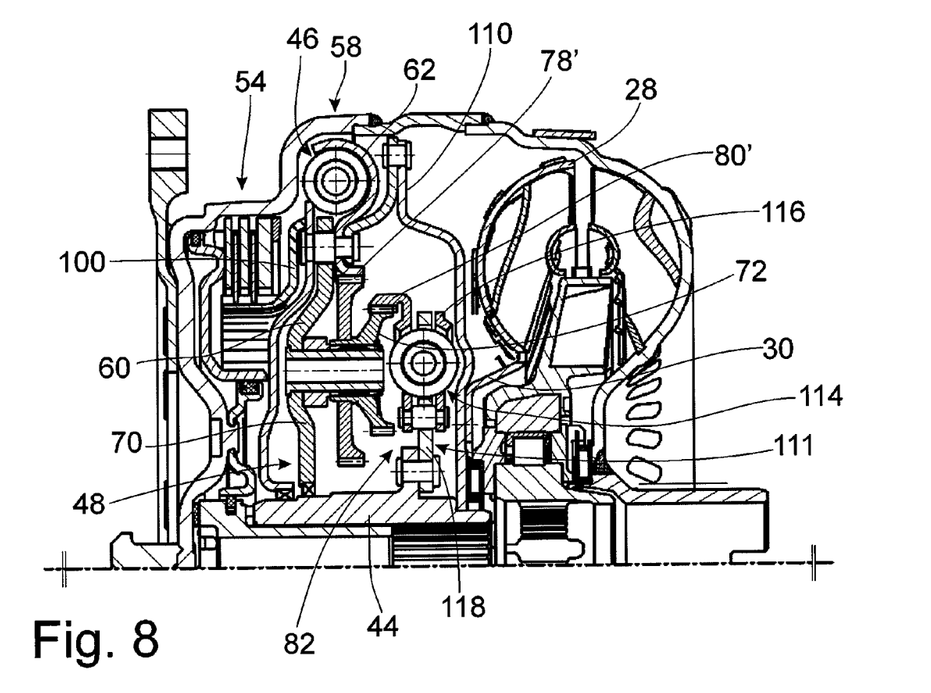
FIG. 8 shows a fragmentary longitudinal sectional view through a construction of the coupling device shown in FIG. 7.

An embodiment of this construction principle is illustrated in FIG. 8. The torsional vibration damper 58, whose primary side 60 formed as central disk element is coupled with the friction element carrier 100 and provides in the radially inner region thereof the planet gear carrier 70 of the second torque transmission path 48, is shown downstream of the lockup clutch and friction element carrier 100 in the torque flow. The planet gears 72 are carried on the planet gear carrier 70 so as to be rotatable around respective axes of rotation. A connection element arrangement 110 is connected to the secondary side 62 by the rivet bolts connecting the two cover disk elements of the secondary side 62 of the torsional vibration damper 58; the turbine 28 is supported at this connection element arrangement 100 and is coupled into the first torque transmission path 46 in this way.

The ring gear 78' is formed radially inwardly by the cover disk element of the secondary side 62 that faces the turbine 28. The output-side ring gear 80' is provided by one of the cover disk elements of the primary side 116 of the torsional vibration damper 114 of the further oscillation system 112. A central disk element of the secondary side 118 of the torsional vibration damper 114 is coupled to the driven member 44 by riveting or, for example, in that it is formed integral with it.

By means of this construction, the output-side mass, i.e., the mass at the secondary side 118 of the further oscillation system 112, is kept very low, which advantageously influences the vibration damping behavior.

The turbine 28 can be supported together with the connection element arrangement 110 with respect to the driven member 44 by an axial/radial bearing. The primary side 60 of the torsional vibration damper 58 providing the planet gear carrier 70 and the secondary side 62 thereof can also be rotatably supported on the driven member 44 by respective bearings.

Figure 9:
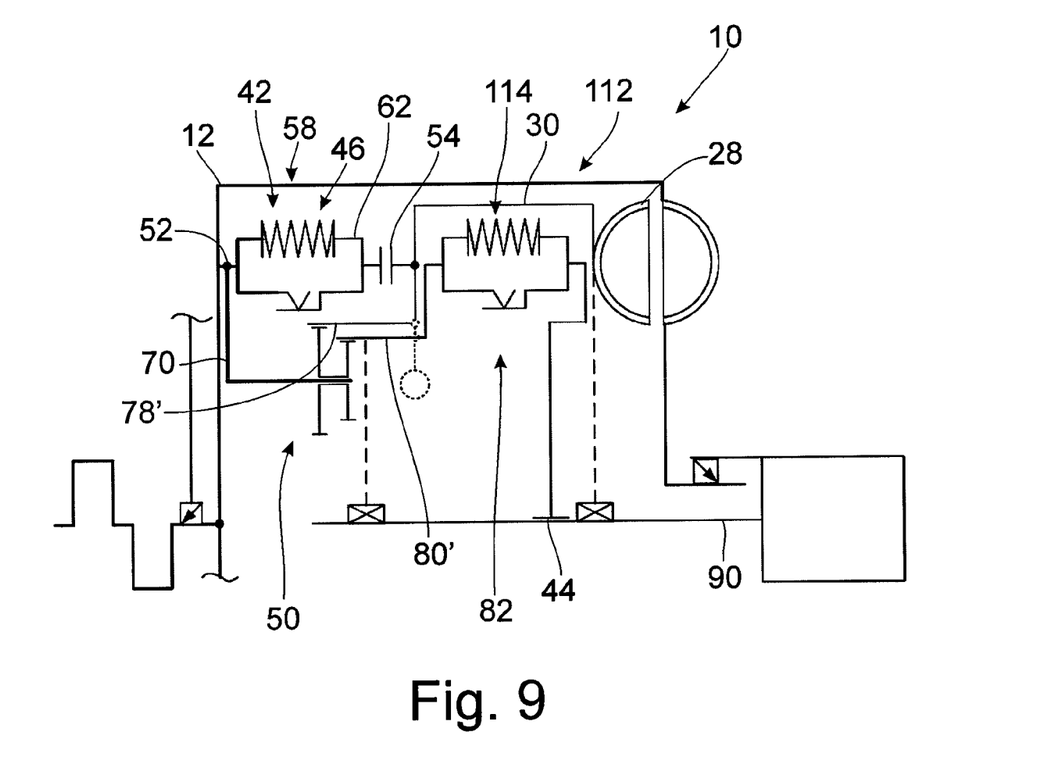
FIG. 9 shows another view corresponding to FIG. 1 of an alternative embodiment.

FIG. 9 shows a coupling device 10 in which the input region 52 of the torsional vibration damping arrangement 42 is fixedly connected to the housing 12. In this case, the lockup clutch 54 is integrated in the first torque transmission path 46 and lies between the secondary side 62 of the torsional vibration damper 58 and the ring gear 78 to which the turbine 28 is also connected. The ring gear 80' is coupled to the driven member by the torsional vibration damper 114 of the further oscillation system 112. The turbine 112 and also the ring gear 80' can be rotatably supported on the transmission input shaft 90 by respective bearing supports formed, for example, as rolling element bearings or plain bearings. Alternatively, a bearing support could also be provided with respect to the housing 12.

Figure 10:
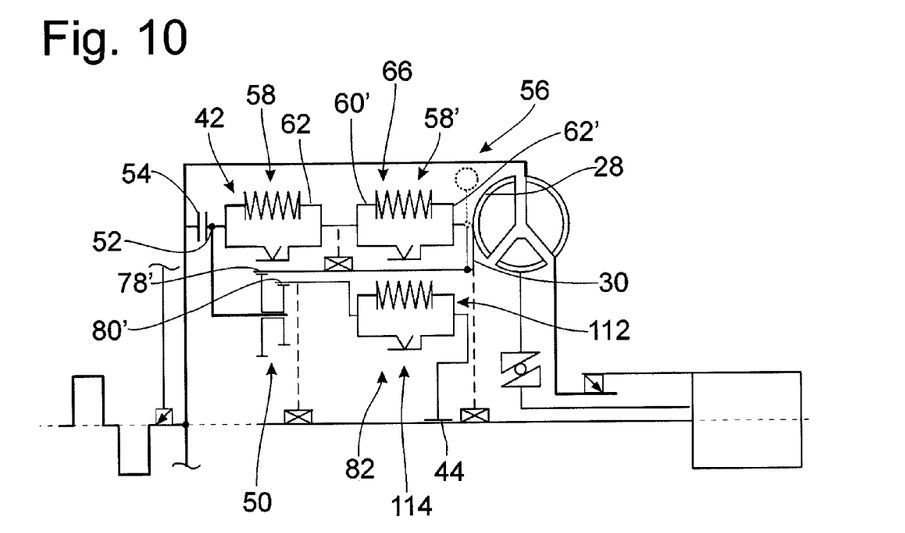
FIG. 10 shows another view corresponding to FIG. 1 of an alternative embodiment.

FIG. 10 shows an embodiment in which the oscillation system 66 of the torsional vibration damping arrangement 42 and of the phase shifter arrangement 56 has two torsional vibration dampers 58, 58' acting in series. The turbine 28 is coupled to the secondary side 62' of the torsional vibration damper 58', i.e., the secondary side of the oscillation system 66. The further oscillation system 112 with its torsional vibration damper 114 is arranged in the output region 82 of the torsional vibration damping arrangement 42 and provides a torque transmission connection to the driven member 44.

Figure 11:
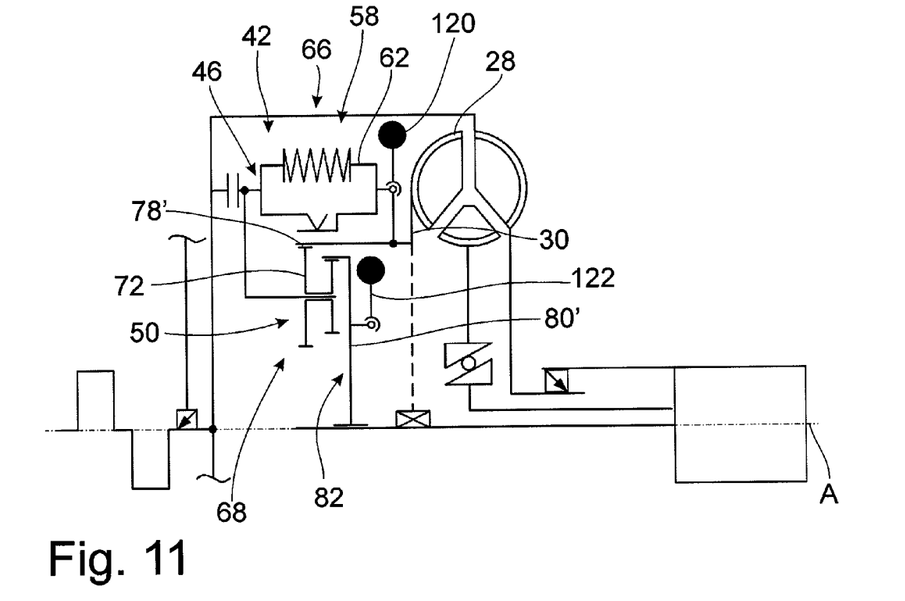
FIG. 11 shows another view corresponding to FIG. 1 of an alternative embodiment.

FIG. 11 shows a construction which substantially corresponds to the construction already described with reference to FIG. 1. However, one difference is that ring gears 78', 80' serve as coupling gears in this case for cooperating with the planet gears 72 of the planetary transmission arrangement 68. The turbine 28 is connected to the ring gear 78', which is associated with the first torque transmission path 46, as well as to the secondary side 62 of the torsional vibration damper 58. A vibration damping arrangement 120 is coupled to this secondary side 62. This vibration damping arrangement 120 can be designed so as to be speed-adaptive and can include one or more deflection masses which can be deflected around the axis of rotation A along associated defection paths in circumferential direction. These deflection paths are curved in such a way that they have a vertex region in which they are at the greatest distance from the axis of rotation A. When deflected out of this vertex region as a result of rotational accelerations, the deflection masses move along the associated paths in circumferential direction and radially inward to the axis of rotation so that they absorb potential energy.

A vibration damping arrangement of the kind mentioned above can be configured to excitation frequencies or also higher excitation orders thereof by selecting the masses and the curvature of the associated deflection paths. In a four cylinder engine, for example, it can be configured to the second order of the firing frequency or the fourth order of the firing frequency. In so doing, it may be desirable to have a spread in the constructional configuration to the respective excitation order.

Alternatively or in addition, it is possible to configure the vibration damping arrangement with one or more oscillation masses which can be deflected against the action of a return spring. Excitation frequencies can be tuned to through selection of the stiffness of the spring or springs or movable masses.

A further vibration damping arrangement of this kind, i.e., provided, for example, by one or more masses which can be deflected against spring force or masses which are movable along respective deflection paths, can also be provided at the output region 82 in the form of a vibration damping arrangement 122.

It is important that vibration damping arrangements of this kind lead to the deflection of respective moving masses when rotational irregularities occur, but do not transmit any torque themselves.

Figure 12:
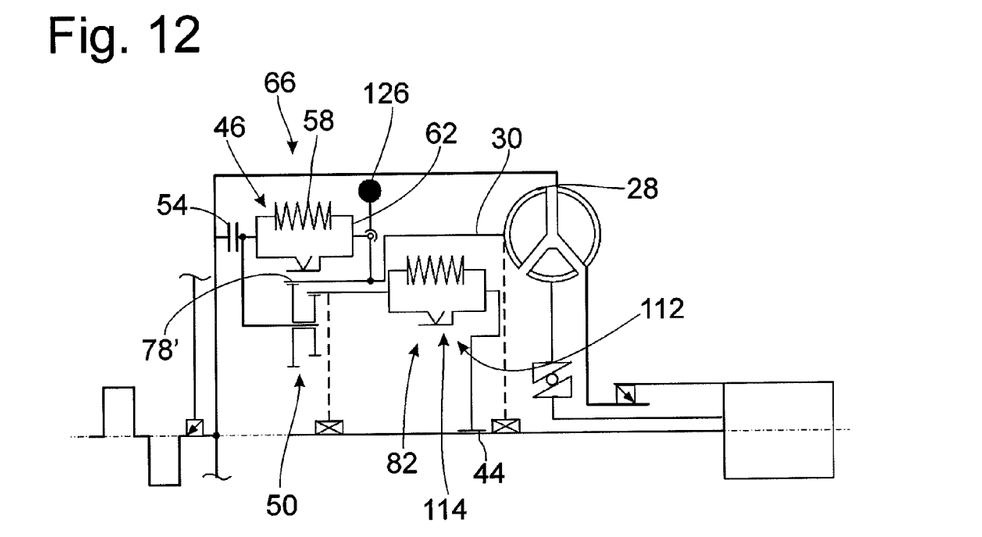
FIG. 12 shows another view corresponding to FIG. 1 of an alternative embodiment.

FIG. 12 shows the combination of the embodiment shown in FIG. 11, i.e., the incorporation of a vibration damping arrangement 120 in the first torque transmission path 46, with a further oscillation system 112, for example, a torsional vibration damper 114, associated with the output region 82. The vibration damping arrangement 120 is coupled together with the secondary side 62 of the torsional vibration damper 58 to the ring gear 78' and to the turbine 28.

Figure 13:
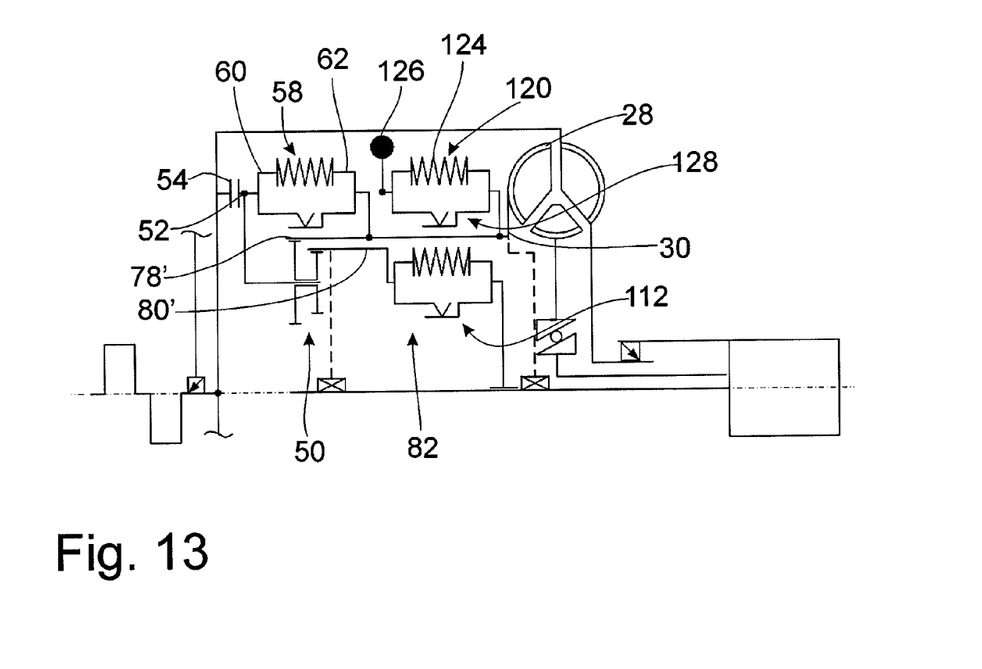
FIG. 13 shows another view corresponding to FIG. 1 of an alternative embodiment.

In the embodiment shown in FIG. 13 the vibration damping arrangement 120 which, together with the turbine 28, is coupled to the secondary side 62 of the torsional vibration damper 58 and therefore also to the ring gear 78' is formed as a mass 126 which can be deflected against the action of a spring unit 124. In so doing, the spring unit can include one or more springs which act in parallel and/or in series and, in parallel with the latter, a friction damping arrangement 128. The mass 126 can have one or more mass parts. A vibration damping arrangement of this type which is formed with a mass which can oscillate against spring action can be tuned to an exciting frequency as fixed-frequency mass damper, i.e., does not serve to transmit torque in this case either.

The spring or springs of the spring unit 124 can be constructed as coil springs, but can also be provided in the form of elastic, e.g., rubber-like, material.

By integrating a torsional vibration damping arrangement acting or constructed in accordance with the invention into the torque transmission path between a housing and a driven member in a hydrodynamic coupling device, effective measures having a very strong vibration damping effect which contribute to an appreciably increased driving comfort are integrated into a drivetrain in a basically simple construction. The destructive superposition of oscillation components achieved by the phase-shifted superposition of two torque components of the total torque to be transmitted achieves in a very compact construction a vibration damping level which could otherwise only be achieved with spring dampers of considerably larger dimensions. Noises in the drivetrain are also substantially reduced by this substantially improved vibration damping behavior. Due to the appreciably reduced oscillation component in the torque introduced into the drivetrain, it is further possible that the lockup clutch can be closed already at low rotational speed, which permits a more energy-efficient operation of a vehicle.

It is further to be noted that the principles of the invention can of course also be applied when the coupling device is constructed without a stator. In this case, it cannot perform the function of torque conversion so as to increase torque, but rather acts as a fluid coupling or flow coupling.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A hydrodynamic coupling arrangement, comprising:
a housing arrangement capable of being filled with a fluid;
an impeller rotatable with the housing arrangement around an axis of rotation;
a turbine arranged in the housing arrangement rotatable with a driven member around the axis of rotation;
a lockup clutch for producing a torque transmission connection between the housing arrangement and the driven member;
a torsional vibration damping arrangement including an input region and an output region;
a first torque transmission path;
a second torque transmission path parallel to the first torque transmission path; and
a coupling arrangement for superposing torques transmitted via the first and second torque transmission paths, the coupling arrangement being provided between the input region and the output region, wherein the torsional vibration damping arrangement includes at least in the first torque transmission path a phase shifter arrangement for generating a phase shift of a rotational irregularity transmitted via the first torque transmission path relative to a rotational irregularity transmitted via the second torque transmission path.

2. The hydrodynamic coupling arrangement according to claim 1, wherein the phase shifter arrangement includes a first oscillation system having a primary side and a secondary side which is rotatable relative to the primary side around the axis of rotation against a force of a first spring arrangement.

3. The hydrodynamic coupling arrangement according to claim 2, wherein the output region includes a further oscillation system including a primary side and a secondary side which is rotatable relative to the primary side of the further oscillation system against an action of a second spring arrangement.

4. The hydrodynamic coupling arrangement according to claim 3, wherein at least one of the first oscillation system and the further oscillation system includes at least two vibration dampers which are arranged in series with one another and respectively comprise a primary side and a secondary side which is rotatable relative to the primary side.

5. The hydrodynamic coupling arrangement according to claim 3, wherein at least one of the first oscillation system and the further oscillation system includes at least two vibration dampers which work in parallel with one another and respectively comprise a primary side and a secondary side which is rotatable relative to the primary side.

6. The hydrodynamic coupling arrangement according to claim 3, wherein at least one of the first oscillation system and the further oscillation system includes a speed-adaptive vibration damping arrangement having at least one deflection mass which can be deflected in a circumferential direction from a basic position so as to change its distance from the axis of rotation.

7. The hydrodynamic coupling arrangement according to claim 3, wherein at least one of the first oscillation system and the further oscillation system includes a fixed-frequency vibration damping arrangement having at least one oscillation mass which can be deflected against an action of a return spring arrangement.

8. The hydrodynamic coupling arrangement according to claim 3, further comprising:
a friction damping arrangement associated with at least one of the first oscillation system and with the further oscillation system, wherein friction damping arrangement opposes a relative rotation between the primary side and the secondary side of the oscillation system.

9. The hydrodynamic coupling arrangement according to claim 2, wherein the turbine is coupled to the secondary side of the first oscillation system.

10. The hydrodynamic coupling arrangement according to claim 1, wherein the turbine is coupled to at least one of the first and second torque transmission paths.

11. The hydrodynamic coupling arrangement according to claim 10, wherein the turbine is coupled to the first torque transmission path.

12. The hydrodynamic coupling arrangement according to claim 1, wherein the lockup clutch is operatively arranged in one of the first and second torque transmission paths.

13. The hydrodynamic coupling arrangement according to claim 1, wherein the lockup clutch is operatively arranged in the first torque transmission path.

14. The hydrodynamic coupling arrangement according to claim 1, wherein the lockup clutch is operatively arranged in the output region (82).

15. The hydrodynamic coupling arrangement according to claim 1, wherein the lockup clutch is operatively arranged in the input region.

16. The hydrodynamic coupling arrangement according to claim 1, wherein the coupling arrangement comprises a planetary transmission arrangement.

17. The hydrodynamic coupling arrangement according to claim 16, wherein the planetary transmission arrangement includes a planet gear carrier which is connected to the second torque transmission path and which has a plurality of planet gears rotatably supported thereon.

18. The hydrodynamic coupling arrangement according to claim 17, wherein the planetary transmission arrangement includes:
  a first coupling gear arrangement in meshing engagement with the planet gears which is connected to the first torque transmission path, and
  a second coupling gear arrangement in meshing engagement with the planet gears which is connected to the output region.

19. The hydrodynamic coupling arrangement according to claim 18, wherein the first coupling gear arrangement in connection with the planet gears and the second coupling gear arrangement in connection with the planet gears provide transmission ratios that are identical to one another.

20. The hydrodynamic coupling arrangement according to claim 18, wherein the first coupling gear arrangement in connection with the planet gears and the second coupling gear arrangement in connection with the planet gears provide transmission ratios that differ from one another.

21. The hydrodynamic coupling arrangement according to claim 18, wherein the first coupling gear arrangement and the second coupling gear arrangement comprise a ring gear arrangement in each instance.

22. The hydrodynamic coupling arrangement according to claim 18, wherein the first coupling gear arrangement and the second coupling gear arrangement comprise a sun gear arrangement in each instance.

23. The hydrodynamic coupling arrangement according to claim 1, wherein the hydrodynamic coupling arrangement is a torque converter.

* * * * *